UNITED STATES PATENT OFFICE.

JAMES H. GRAY, OF NEW YORK, N. Y., ASSIGNOR TO ILLINOIS STEEL COMPANY, OF CHICAGO, ILLINOIS, A CORPORATION OF ILLINOIS.

MANUFACTURE OF STEEL.

987,715.  Specification of Letters Patent.  Patented Mar. 28, 1911.

No Drawing.  Application filed February 16, 1909.  Serial No. 478,153.

*To all whom it may concern:*

Be it known that I, JAMES H. GRAY, of the borough of Manhattan, in the city and county of New York, in the State of New York, have invented a new and useful Improvement in the Manufacture of Steel, of which the following is a specification.

My invention consists in a process wherein molten pig iron is first treated in the Bessemer converter to remove silicon and carbon to the desired degree, and the bessemerized metal is then dephosphorized by bringing it into contact with a highly oxidized slag, independently prepared, and the dephosphorized metal is finally transformed to high grade steel by treating it in an electric furnace.

By the ordinary Bessemer process, where the converter has an acid lining, silicon and carbon are removed from molten pig iron, but there is no removal of phosphorus. In certain cases it is the practice to transfer the bessemerized metal to an electric furnace where phosphorus is first removed by means of an overlying slag containing lime and oxid of iron. After the application of heat in the electric furnace for a certain time, the slag must be removed, and a new basic slag provided in order to complete the deoxidation and desulfurization of the steel.

By my process I eliminate one of the steps usually performed in the electric furnace, and accomplish the dephosphorizing in a ladle or other vessel which receives the metal from the Bessemer converter, with the consequent saving of time and electric current and lessening of the cost of the steel.

I give the following as an example of the manner in which I work a heat of steel: 15 tons of molten pig iron are placed in a Bessemer converter, and a blast of air is blown through the metal until the carbon, silicon and manganese have been burned out to a considerable extent. It is not necessary to burn out these impurities to the extent that the metal is highly oxidized, but varying degrees of oxidation are admissible. Standing near the Bessemer converter is a cupola furnace, in which has been melted a basic slag consisting preferably of lime and oxid of iron, preferably in about equal proportions, or the slag may be produced in some other type of furnace. Three-fourths of a ton of the molten slag is transferred to a ladle, which is designed to receive the blown metal from the converter. The converter is then caused to pour its contents into the ladle, which fall upon the slag lying in the bottom of the ladle and subsequently pass through the slag as the floating slag rises with the metal as it fills the ladle. During the time in which the metal is being poured upon and through the slag, and during the time consumed in moving the ladle from the converter to the electric furnace, a considerable portion of the phosphorus content of the metal is taken up and oxidized by the slag; for example, metal containing .12 per cent of phosphorus will have its phosphorus content reduced in this manner to .06 per cent. The metal is then poured from the ladle into the electric furnace in such a manner as to introduce the metal with as little as possible of the slag. The removal of sulfur and oxygen from the metal in the electric furnace is then proceeded with in the ordinary way and the customary additions of alloys, etc., are made so as to produce the required quality of high grade steel. The electric furnace is preferably provided with a basic lining, and may be heated by the current from carbon electrodes, or the furnace may be an induction furnace.

The process may be modified in many ways by the skilled metallurgist, since

What I claim as new is:

1. The herein described method of making steel which consists in treating molten metal in a Bessemer converter for the removal of silicon and carbon, transferring the metal from the converter to an electric furnace in a ladle to which a separately formed basic slag has been added, said slag acting to remove phosphorus from the metal during transference.

2. The herein described method of making steel which consists in treating molten metal in a Bessemer converter for the removal of silicon and carbon, pouring the metal into a ladle, on and through a basic slag contained therein for the elimination of phosphorus and transferring the metal in the ladle from the converter to an electric furnace.

3. The herein described method of making steel which consists in treating molten metal in a Bessemer converter for the removal of silicon and carbon, transferring the metal from the converter to an electric furnace in a ladle to which a separately formed basic slag has been added, said slag acting to remove phosphorus from the metal during transference, removing the exhausted slag from the ladle, and adding fresh basic slag to the metal after the transference to the electric furnace.

In testimony whereof, I have hereunto set my hand.

J. H. GRAY.

Witnesses:
  W. A. FORBES,
  EUGENE H. MURPHY.